United States Patent
Kloster

[11] Patent Number: 5,883,772
[45] Date of Patent: Mar. 16, 1999

[54] METHOD OF DETERMINING THE PLAYING TIME OF A MAGNETIC TAPE AND DEVICE FOR CARRYING OUT THE METHOD

[75] Inventor: Frieder Kloster, Alsbach, Germany

[73] Assignee: U.S. Philips Corporation, New York, N.Y.

[21] Appl. No.: 96,581

[22] Filed: Jul. 21, 1993

[30] Foreign Application Priority Data

Jul. 22, 1992 [DE] Germany .................. 42 24 115.4

[51] Int. Cl.$^6$ .................................................. G11B 15/18
[52] U.S. Cl. ............................................................ 360/137
[58] Field of Search .............................................. 360/137

[56] References Cited

U.S. PATENT DOCUMENTS

| | | | |
|---|---|---|---|
| 4,232,371 | 11/1980 | Kamoto | 364/561 |
| 4,280,159 | 7/1981 | Nakayama | 360/137 |
| 4,338,645 | 7/1982 | Mohri et al. | 360/137 |

FOREIGN PATENT DOCUMENTS

| | | |
|---|---|---|
| 61-077185 | 4/1986 | Japan . |
| 62-271279 | 11/1987 | Japan . |
| 3095786 | 4/1991 | Japan . |

*Primary Examiner*—Robert S. Tupper
*Attorney, Agent, or Firm*—Edward W. Goodman

[57] ABSTRACT

A method of determining the total playing time $T_G$ and the residual playing time $T_R$ of a magnetic tape (4) stored on two reels (2, 3) in a cassette (1) in which in a brief winding operation of the magnetic tape (4), the numbers of tacho pulses ($i_1$, $i_2$) at the take-up reel (3) and the supply reel (2) are determined. Moreover, by extracting the magnetic tape (4) from the cassette (1) over a given length ($L_H$), the numbers of tacho pulses ($j_1$, $j_2$) at the take-up reel (3) and the supply reel (2) are determined. From the values thus determined for these pulses ($i_1$, $i_2$, $j_1$, $j_2$) for a given thickness d and speed v of the magnetic tape (4), a given reel-hub diameter K of the take-up reel and the supply reel (2, 3) and a given number u of pulses per reel revolution, it is possible to calculate the total playing time $T_G$ in accordance with the relationship:

$$T_G = \frac{\pi}{4dv} \left[ \left( \frac{uL_H}{\pi(i_1j_2 + i_2j_1)} \right)^2 (i_1^2 + i_2^2) - 2K^2 \right]$$

and the residual playing time $T_R$ in accordance with the relationship:

$$T_R = \frac{\pi}{4dv} \left[ \left( \frac{uL_H i_2}{\pi(i_1j_2 + i_2j_1)} \right)^2 - K^2 \right].$$

7 Claims, 1 Drawing Sheet

METHOD OF DETERMINING THE PLAYING TIME OF A MAGNETIC TAPE AND DEVICE FOR CARRYING OUT THE METHOD

BACKGROUND OF THE INVENTION

1. Field of the Invention

The invention relates to a method of determining the playing time of a magnetic tape, on a supply reel and a take up reel in a magnetic-tape cassette.

2. Description of the Related Art

DE 28 56 509 A1, corresponding to U.S. Pat. No. 4,232, 371, describes a method of indicating the length of the tape on one reel of a cassette comprising two reels. In this device, a loading mechanism extracts a specific length of tape from the cassette with a constant linear velocity, one of the two reels of the cassette being retained. A pulse generator then generates a pulse frequency proportional to the angular velocity. On the basis of the constant linear velocity, the tape thickness and the reel diameter, a microprocessor then calculates the available quantity of tape. In order to calculate the quantity of tape wound on the reel in a specific time $T_S$, the following equation is used:

$$T_S = \frac{v}{4\pi\delta} \left( \frac{1}{P_S^2} - \left( \frac{2\pi R_H}{v} \right)^2 \right)$$

where v is the linear velocity, δ is the thickness of the magnetic tape, $P_S$ is the signal representing the angular velocity of said one reel, and $R_H$ is the diameter of the inner turn of the magnetic tape wound on this reel. A disadvantage of this known device is that one of the two reels has to be retained by a special braking device.

Moreover, DE 36 22 895 A1 describes a method of determining the residual tape length of a magnetic tape wound on a reel spindle, wherein a time measurement device first determines the revolution times $t_L$, $t_R$ of one full revolution of the two tape spools, from which the total time $t=t_L+t_R$ is derived. Subsequently, by comparing the total time t with a given limit value, the reel spindle diameter $D_O$ for the relevant cassette is determined in order to calculate the number of turns $n_L$ and $n_R$ in accordance with the equations:

$$n_L = \frac{(t_L \cdot v)/n - D_0}{2 \cdot d}$$

and $$n_R = \frac{(t_R \cdot v)/n - D_0}{2 \cdot d}$$

where υ is the standard velocity and d is the thickness of the magnetic tape. From the numbers of turns thus obtained, the winding times $T_L$ and $T_R$ are then derived in accordance with the equations $$T_L = \frac{(n_L \cdot D_0) + n_L(n_L + 1)}{v \cdot 60} n$$

and $$T_R = \frac{(n_R \cdot D_0) + n_R(n_R + 1)}{v \cdot 60} n$$

The sum of the two times $T_L$ and $T_R$ represents the residual time T from which the actual thickness of the magnetic tape $$d' = \frac{T_{ist}}{T_{soll}} \cdot d$$

is calculated by comparison with possible nominal times. The actual thickness is finally used for the calculation of the real winding times.

Moreover, it is known from U.S. Pat. No. 4,963,999 to calculate the residual playing time T1 in accordance with the equation $$T1 = \frac{\pi}{tv} \left\{ \frac{\frac{L \cdot t}{\pi} + 2Ro^2}{1 + \left( \frac{Rt}{Rs} \right)^2} - Ro^2 \right\}$$

Here, t is the thickness, υ is the velocity and L is the total length of the magnetic tape, $R_o$ is the radius of the reel hub, $R_t$ is the radius of the take-up spool and $R_s$ is the radius of the supply spool in the cassette. The velocity of the magnetic tape is derived from the angular velocity of a capstan driving the magnetic tape.

SUMMARY OF THE INVENTION

It is an object of the present invention to provide a further method of determining the available total and residual playing time of a magnetic tape wound on two reels in a cassette.

This object is achieved by briefly winding the magnetic tape on the supply and the take-up reel while counting first winding pulses then generated; extracting the magnetic tape from the cassette over a given length, second winding pulses then generated being counted; and calculating the residual playing time in a microprocessor on the basis of values determined for the counted first and second winding pulses and on the basis of given values relating to the thickness and speed of the magnetic tape, to the hub diameter of the two reels, and to the pulse numbers per revolution of the two reels.

The method in accordance with the invention has the advantage that both the total playing time and the residual playing time of the magnetic tape on the supply reel can be derived with satisfactory accuracy from the ratio of winding pulses produced by means of a short winding operation and by means of a threading operation which must be carried out anyway.

BRIEF DESCRIPTION OF THE DRAWING

An embodiment of the invention will now be described in more detail, by way of example, with reference to the accompanying drawing. In the drawing.

DESCRIPTION OF THE PREFERRED EMBODIMENT

Figure 1:
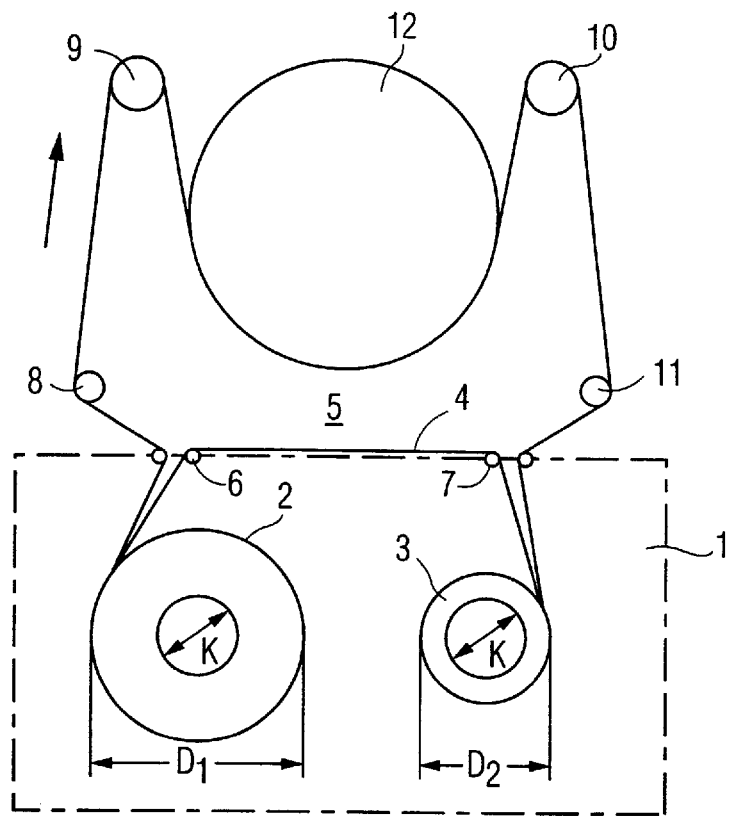
FIG. 1 shows, diagrammatically, a magnetic-tape apparatus comprising a known loading device for threading in/out a magnetic tape contained in a cassette.

In FIG. 1 a magnetic-tape cassette bears the reference numeral 1. The dash-dot line diagrammatically represents the outline of the magnetic-tape cassette. The magnetic-tape cassette 1 accommodates a supply reel 2 and a take-up reel 3 for a magnetic tape 4. The spool diameter of the supply reel 2 is referenced $D_1$, the spool diameter of the take-up reel 3 is referenced $D_2$, and the reel-hub diameter of the two reels bears the reference K. At the location of the cassette mouth 5, the magnetic tape 4 is guided by means of guide elements 6 and 7.

During a thread-in operation tape-guide elements 8, 9, 10 and 11 engage behind the magnetic tape 4 in the cassette 1 at the location of the cassette mouth 5, the magnetic tape 4 is pulled out of the magnetic-tape cassette 1 and is wrapped partly around a drum-shaped scanning device 12. Such tape loading devices are known per se (U.S. Pat. No. 4,807,064) and are therefore not described in more detail.

For the transport of the magnetic tape 4, the supply reel 2 and the take-up reel 3 are each driven by a reel motor (not shown). The speed of these reel motors is controlled by processing tacho pulses generated by means of tacho discs. The tacho discs are rotationally locked to shafts of the reel motors.

Figure 2:
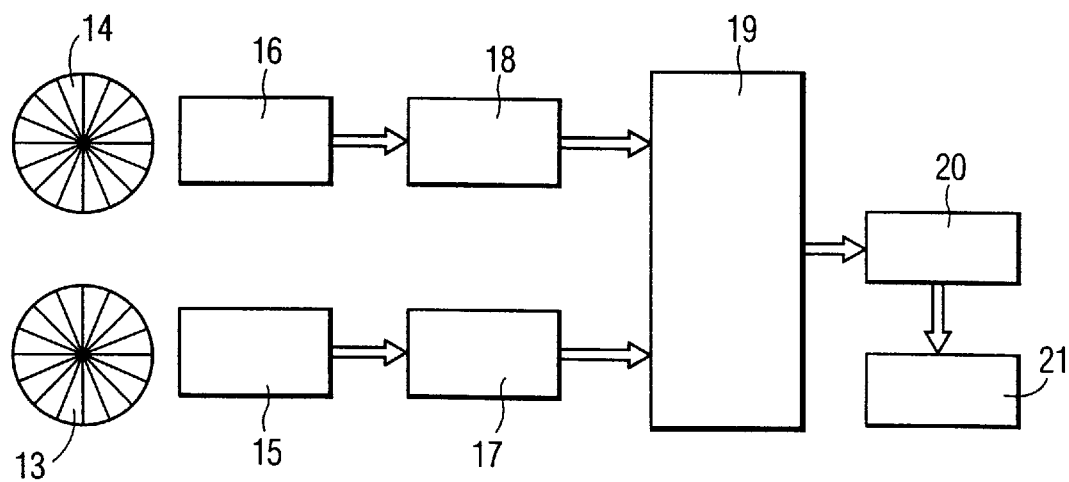
FIG. 2 is a block diagram to explain the method in accordance with the invention.

The block diagram in FIG. 2 shows diagrammatically tacho discs 13 and 14 of the drive motors for the supply reel 2 and the take-up reel 3. It is assumed that a graduation on the tacho discs 13 and 14 is such that for each revolution, 400 tacho pulses are generated by scanning with detectors 16 and 17. The tacho pulses appearing at an output of the detector 15 are counted by a subsequent counter 17, and the tacho pulses appearing at the output of the detector 16 are counted by a counter 18. The counts at the outputs of the two counters 17, 18 are applied to inputs of a microprocessor 19, which—as will be described comprehensively hereinafter— calculates both the total playing time and the residual playing time of the magnetic tape 4 on the supply reel 2 and which displays the results on a display device 21 after buffering in a memory 20.

The manner in which the total playing time $T_G$ and the residual playing time $T_R$ of a cassette can be determined will now be described with reference to FIGS. 1 and 2. It is assumed that the diameter K of the reel hub of the supply reel 2 is equal to the diameter K of the reel hub of the take-up reel 3. It is also assumed that the reel hub diameter K as well as the thickness d and the reproduction speed v of the magnetic tape are known. The length $L_S$ of the magnetic tape on a reel may be represented by the following equation:

$$L_s = \frac{\pi}{4d}(D^2 - K^2) \quad (1)$$

where D is the diameter of the relevant reel.

The total playing time $T_G$ of the cassette and the residual playing time $T_R$ on the supply reel 2 follows from the tape speed v and the length of tape $L_{S1}$ and $L_{S2}$ on the two reels:

$$T_G = \frac{L_{S1} + L_{S2}}{v} \quad (2)$$

$$T_R = \frac{L_{S1}}{v} \quad (3)$$

Combining equations (1) with (2) and (1) with (3) yields:

$$T_G = \frac{\pi}{4dv}(D_1^2 + D_2^2 - 2 \cdot K^2) \quad (4)$$

$$T_R = \frac{\pi}{4dv}(D_1^2 - K^2) \quad (5)$$

The spool diameters $D_1$ and $D_2$ for the supply reel 2 and the take-up reel 3 are unknown. These unknown spool diameters can be determined in that upon insertion of the cassette 1 into the cassette holder of a magnetic-tape apparatus, a specific length of tape is wound from one reel to the other.

The tacho pulses obtained by scanning of the tacho discs 13 and 14 are then counted by the counters 17 and 18, so that a specific value relating to the number of detected pulses $i_1$ appears at the output of the counter 17 and another value relating to the number of pulses $i_2$ appears at the output of the counter 18. The ratio between the numbers of pulses $i_1$ and $i_2$ is inversely proportional to the two spool diameters $D_1$ and $D_2$:

$$\frac{D_1}{D_2} = \frac{i_2}{i_1} \quad (6)$$

In order to determine the ratio between the spool diameters only a short winding operation is required, a single revolution being adequate. After this short winding operation, the magnetic tape is withdrawn from the cassette 1 by the tape-guide elements 8 to 11 and is wrapped around the drum-shaped scanning device 12 for a scanning process. During this threading operation the tacho discs 13 and 14 are also scanned and the tacho pulses then generated by the detectors 15 and 16 are counted by the counters 17 and 18. After threading, a specific value relating to the number of pulses $j_1$ appears at the output of the counter 17, and a specific value relating to the number of pulses $j_2$ appears at the output of the counter 18. The length $L_H$ of the magnetic tape 4 thus extracted may be represented by the following equation:

$$L_H = \frac{\pi}{u}(j_1 \cdot D_1 + j_2 \cdot D_2) \quad (7)$$

where u is the number of pulses per reel revolution. Since the graduation of the tacho discs is known, this means that u=400. Moreover, it follows from the mechanical dimensions of the deck and the loading device of the magnetic-tape apparatus, which length $L_H$ of the magnetic tape 4 must be extracted from the cassette in order to reach the operating position. In the present case, the effective length $L_H$ of the extracted magnetic tape is 51 cm.

Solving the two equations (6) and (7) yields for the two spool diameters $D_1$ and $D_2$:

$$D_1 = \frac{u}{\pi} L_H \frac{i_2}{(i_1 j_2 + i_2 j_1)} \quad (8)$$

$$D_2 = \frac{u}{\pi} L_H \frac{i_1}{(i_1 j_2 + i_2 j_1)} \quad (9)$$

From the equations (4), (5) and (8), (9) thus found the equations for the total playing time $T_G$ and the residual playing time $T_R$ can be derived:

$$T_G = \frac{\pi}{4dv}\left[\left(\frac{uL_H}{\pi(i_1 j_2 + i_2 j_1)}\right)^2 (i_1^2 + i_2^2) - 2K^2\right] \quad (10)$$

$$T_R = \frac{\pi}{4dv}\left[\left(\frac{uL_H i_2}{\pi(i_1 j_2 + i_2 j_1)}\right)^2 - K^2\right] \quad (11)$$

For the recording and reproduction of digital video signals, for professional purposes magnetic-tape cassettes of three different sizes are used. The largest of these cassettes has a length of 366 mm, a depth of 206 mm and a width of 33 mm. This cassette accommodates two tape spools of 181 mm diameter each, the reel hub diameter K of each reel being 58 mm. The magnetic tape in the cassette has a tape thickness d=13 μm. By way of illustration, it is further assumed that after insertion of such a cassette, the short winding operation produces numbers of pulses $i_1$=176 and $i_2$=420 at the outputs of the counters 17 and 18, 400 pulses (u) being generated for each revolution of a reel. When the magnetic tape 4 is extracted from the cassette 1 numbers of pulses $j_1$=240 and $j_2$=340 are counted, the effective length $L_H$ of the magnetic tape 4 withdrawn from the magnetic-tape cassette (1) being 51 cm. Insertion of the above-mentioned constants and variables in equation (11) results in a residual playing time $T_R$ of 37 minutes and 42 seconds and a total playing time $T_G$ of 40 minutes and 12 seconds in the case of a reproduction speed of v=680 mm/s. The approximate values thus calculated for the residual playing time $T_R$ and the total playing time $T_G$ are sufficiently accurate. The present numerical example shows that the values thus determined only differ from the nominal values (nominal value of $T_G$=40 minutes, 22 seconds) by approximately 0.5%.

The only variables required by the program performed by the microprocessor (19) in order to process the equations (10) and (11) are the pulse values $i_1$, $i_2$, $j_1$ and $j_2$ supplied by the counters 17 and 18. The other values can be fixed constants.

I claim:

1. A method of determining the playing time of a magnetic tape on a supply reel and a take-up reel in a magnetic-tape cassette, said method comprising the steps:

briefly winding the magnetic tape from the supply reel to the take-up reel;

generating and counting first winding pulses ($i_1$, $i_2$) relating to the amount of rotation of said supply reel and said take-up reel during said step of briefly winding the magnetic tape;

subsequently extracting the magnetic tape accommodated in the magnetic-tape cassette over a given length ($L_H$);

generating and counting second winding pulses ($j_1$, $j_2$) relating to the amount of rotation of said supply reel and said take-up reel during said step of extracting the magnetic tape; and calculating a residual playing time ($T_R$) of the magnetic tape left in the magnetic-tape cassette on the basis of values determined for the counted first and second winding pulses ($i_1$, $i_2$, $j_1$, $j_2$) and on the basis of given values relating to the thickness (d) and speed (v) of the magnetic tape, to the hub diameter (K) of the supply and take-up reels, and to the number (u) of winding pulses generated per revolution of the supply and take-up reels.

2. A method as claimed in claim 1, characterized in that said method further comprises the step:

calculating an available total playing time ($T_G$) by said microprocessor on the basis of values determined for the counted first and second winding pulses.

3. A method as claimed in claim 1, characterized in that the steps of briefly winding the magnetic tape and generating and counting the first winding pulses comprise:

(a) determining the number of pulses $i_1$ generated at the take-up reel when the magnetic tape inside the cassette is briefly wound; and (b) determining the number of pulses $i_2$ generated at the supply reel when the magnetic tape inside the cassette is briefly wound;

the steps of extracting the magnetic tape and generating and counting the second winding pulses comprise:

(e) determining the number of pulses $j_1$ generated at the take-up reel when the magnetic tape is extracted from the cassette over a given length $L_H$; and (d) determining the number of pulses $j_2$ generated at the supply reel during said extraction of the magnetic tape from the cassette;

and the step of calculating the residual playing time comprises:

(c) calculating the available residual playing time $T_R$ of the magnetic tape in accordance with the relationship:

$$T_R = \frac{\Pi}{4dv} \left( \left( \frac{uL_H i_2}{\Pi(i_1 j_2 + i_2 j_1)} \right)^2 - K^2 \right)$$

where d is a given thickness of the magnetic tape, v is a given speed of the magnetic tape, K is a given reel-hub diameter of the take-up and supply reels, and u is a given number of pulses per reel revolution.

4. A method as claimed in claim 2, characterized in that the steps of briefly winding the magnetic tape and generating and counting the first winding pulses comprise:

(a) determining the number of pulses $j_1$, generated at the take-up reel when the magnetic tape inside the cassette is briefly wound; and (b) determining the number of pulses $i_2$ generated at the supply reel when the magnetic tape inside the cassette is briefly wound;

the steps of extracting the magnetic tape and generating and counting the second winding pulses comprise:

(c) determining the number of pulses $j_1$ generated at the take-up reel when the magnetic tape is extracted from the cassette over a given length $L_H$; and (d) determining the number of pulses $j_2$ generated at the supply reel during said extraction of the magnetic tape from the cassette;

and the step of calculating the total playing time comprises:

(e) calculating the available total playing time $T_G$ of the magnetic tape in accordance with the relationship:

$$T_G = \frac{\Pi}{4dv} \left[ \left( \frac{uL_H}{\Pi(i_1 j_2 + i_2 j_1)} \right)^2 (i_1^2 + i_2^2) - 2K^2 \right]$$

where d is a given thickness of the magnetic tape, v is a given speed of the magnetic tape, K is a given reel-hub diameter of the take-up and supply reels, and us is a given number of pulses per revolution of the take-up and the supply reel, respectively.

5. A device for determining the playing time of a magnetic tape on a supply reel and a take-up reel in a magnetic-tape cassette, said device comprising:

means for briefly winding the magnetic tape from the supply reel to the take-up reel;

means for generating and counting first winding pulses ($i_1$, $i_2$) relating to the amount of rotation of said supply reel and said take-up reel while said means for briefly winding the magnetic tape is winding the magnetic tape;

means for subsequently extracting the magnetic tape accommodated in the magnetic-tape cassette over a given length ($L_H$);

means for generating and counting second winding pulses ($j_1$, $j_2$) relating to the amount of rotation of said supply reel and said take-up reel while said means for extracting the magnetic tape is extracting the magnetic tape; and a microprocessor for calculating a residual playing time ($T_R$) of the magnetic tape left in the magnetic-tape cassette on the basis of values determined for the counted first and second winding pulses ($i_1$, $i_2$, $j_1$, $j_2$)

and on the basis of given values relating to the thickness (d) and speed (v) of the magnetic tape, to the hub diameter (K) of the supply and take-up reels, and to the number (u) of winding pulses generated per revolution of the supply and take-up reels.

6. A magnetic-tape-cassette apparatus having means for determining the residual playing time $T_R$ of magnetic tape in a magnetic tape cassette, said magnetic-tape-cassette apparatus comprising:

a loading device adapted to extract a part of the magnetic tape accommodated in the cassette and to wrap said part of the magnetic tape around a scanning device, said part of the magnetic tape having a given length ($L_H$);

a device for driving a take-up reel and a supply reel accommodated in the cassette, comprising, on a drive spindle of each of the supply and take-up reels, a detector for generating pulses ($i_1$, $i_2$, $j_1$, $j_2$);

a first and a second counting device for counting the pulses ($i_1$, $i_2$, $j_1$, $j_2$) generated by the detectors, said first and second counting devices counting first counting pulses ($i_1$, $i_2$) from said take-up and supply reel detectors when said device for driving briefly drives said take-up and supply reels causing a quantity of said magnetic tape to wind from said supply reel to said take-up reel, and said first and second counting devices counting second counting pulses ($j_1$, $j_2$) from said take-up and supply reel detectors when said loading device extracts the part of the magnetic tape; and a microprocessor which receives the first and second counting pulses ($i_1$, $i_2$, $j_1$, $j_2$) appearing at outputs of the first and the second counting devices and, subsequently, on the basis of given values relating to the thickness d and the speed v of the magnetic tape, to the reel-hub diameter K of the supply and take-up reels, and to the number u of pulses per reel revolution, calculates, by program control, the residual playing time $T_R$ of the magnetic tape in accordance with the relationship:

$$T_R = \frac{\Pi}{4dv}\left(\left(\frac{uL_H i_2}{\Pi(i_1 j_2 + i_2 j_1)}\right)^2 - K^2\right).$$

7. A magnetic-tape-cassette apparatus having means for determining the available total playing time $T_G$ of magnetic tape accommodated in a magnetic tape cassette, said magnetic-tape-cassette apparatus comprising:

a loading device adapted to extract a part of the magnetic tape accommodated in the cassette and to wrap said part of the magnetic tape around a scanning device, said part of the magnetic tape having a given length ($L_H$);

a device for driving a take-up reel and a supply reel accommodated in the cassette, comprising, on a drive spindle of each of the supply and take-up reels, a detector for generating pulses ($i_1$, $i_2$, $j_1$, $j_2$);

a first and a second counting device for counting the pulses ($i_1$, $i_2$, $j_1$, $j_2$) generated by the detectors, said first and second counting devices counting first counting pulses ($i_1$, $i_2$) from said take-up and supply reel detectors when said device for driving briefly drives said take-up and supply reels causing a quantity of said magnetic tape to pass from said supply reel to said take-up reel, and said first and second counting devices counting second counting pulses ($j_1$, $j_2$) from said take-up and supply reel detectors when said loading device extracts a part ($L_H$) of the magnetic tape; and a microprocessor which receives the first and second counting pulses ($i_1$, $i_2$, $j_1$, $j_2$) appearing at outputs of the first and the second counting devices and, subsequently, on the basis of given values relating to the thickness d and the speed v of the magnetic tape, to the reel-hub diameter K of the supply and take-up reels, and to the number u of pulses per reel revolution, calculates, by program control, the total playing time $T_G$ of the magnetic tape in accordance with the relationship:

$$T_G = \frac{\Pi}{4dv}\left(\left(\frac{uL_H}{\Pi(i_1 j_2 + i_2 j_1)}\right)^2 (i_1^2 + i_2^2) - 2K^2\right).$$

* * * * *